US009685079B2

(12) United States Patent
Bulan et al.

(10) Patent No.: US 9,685,079 B2
(45) Date of Patent: Jun. 20, 2017

(54) SHORT-TIME STOPPING DETECTION FROM RED LIGHT CAMERA EVIDENTIARY PHOTOS

(71) Applicant: Conduent Business Services, LLC, Dallas, TX (US)

(72) Inventors: Orhan Bulan, Henrietta, NY (US); Aaron M. Burry, Ontario, NY (US); Robert P. Loce, Webster, NY (US)

(73) Assignee: Conduent Business Services, LLC, Dallas, TX (US)

( * ) Notice: Subject to any disclaimer, the term of this patent is extended or adjusted under 35 U.S.C. 154(b) by 400 days.

(21) Appl. No.: 14/278,196

(22) Filed: May 15, 2014

(65) Prior Publication Data

US 2015/0332588 A1 Nov. 19, 2015

(51) Int. Cl.
*G06K 9/00* (2006.01)
*G08G 1/017* (2006.01)
*H04N 7/18* (2006.01)
*G06K 9/46* (2006.01)

(52) U.S. Cl.
CPC ....... *G08G 1/0175* (2013.01); *G06K 9/00785* (2013.01); *H04N 7/183* (2013.01); *H04N 7/188* (2013.01); *G06K 9/4671* (2013.01)

(58) Field of Classification Search
None
See application file for complete search history.

(56) References Cited

U.S. PATENT DOCUMENTS

| 6,970,102 B2* | 11/2005 | Ciolli | G08G 1/052 340/425.5 |
| 8,831,287 B2* | 9/2014 | Dasu | G06T 7/0008 348/143 |
| 8,970,701 B2* | 3/2015 | Lao | G06K 9/00785 348/149 |
| 2010/0322476 A1* | 12/2010 | Kanhere | G08G 1/0175 382/103 |
| 2011/0182473 A1* | 7/2011 | Wang | G08G 1/04 382/103 |

(Continued)

OTHER PUBLICATIONS

U.S. Appl. No. 14/278,218, entitled "Short-Time Stopping Detection From Red Light Camera Videos", filed May 15, 2014, by Orhan Bulan et al.

(Continued)

*Primary Examiner* — Nancy Bitar
(74) *Attorney, Agent, or Firm* — Fay Sharpe LLP

(57) ABSTRACT

A method for detecting a vehicle running a stop signal includes acquiring at least two evidentiary images of a candidate violating vehicle captured from at least one camera monitoring an intersection. The method includes extracting feature points in each of the at least two evidentiary images. The method includes computing feature descriptors for each of the extracted feature points. The method includes determining a correspondence between feature points having matching feature descriptors at different locations in the at least two evidentiary images. The method includes extracting at least one attribute for each correspondence. The method includes determining if the candidate violating vehicle is in violation of running the stop signal using the extracted attribute.

20 Claims, 9 Drawing Sheets

(56) References Cited

U.S. PATENT DOCUMENTS

| | | | | |
|---|---|---|---|---|
| 2012/0134532 A1* | 5/2012 | Ni | ............... | G08G 1/0175 382/103 |
| 2012/0249795 A1* | 10/2012 | Ito | ............... | G06K 9/00825 348/148 |
| 2012/0262579 A1* | 10/2012 | Chen | ............... | G08G 1/04 348/148 |
| 2013/0027704 A1* | 1/2013 | Davis | ............... | G08G 1/081 356/402 |

OTHER PUBLICATIONS

Lowe, et al., *Distinctive Image Features from Scale-Invariant Keypoints*, International Journal of Computer Vision 60.2 (2004) at p. 91-110.

Bay, et al., *Speeded-up Robust Features (SURF)*, Computer Vision and Image Understanding 100.3 (2008) at p. 346-359.

Harris et al., *A Combined Corner and Edge Detector*, Alvey Vision Conference, vol. 15, 1998, pp. 147-151.

Rosten et al., *Machine Learning for High-Speed Corner Detection*, Computer Vision-ECCV (2006) at p. 430-443.

Tomasi et al., *Detection and Tracking of Point Features*, Technical Report, CMU-CS-91-132m School of Computer Science, Carnegie Mellon Univ. (1991).

Forssen et al., *Shape Descriptors for Maximally Stable Extremal Regions*, International Conference on Computer Vision IEEE (2007) at p. 1-8.

Dalal et al., *Histograms of Oriented Gradients for Human Detection*, Computer Vision and Pattern Recognition (2005), 8 pgs.

Ke et al., *PCA-SIFT: A More Distinctive Representation for Local Image Descriptors*, Proc. of 2004 IEEE Computer Vision and Pattern Recognition, 8 pgs.

\* cited by examiner

SHORT-TIME STOPPING DETECTION FROM RED LIGHT CAMERA EVIDENTIARY PHOTOS

BACKGROUND

The present disclosure relates to a vision-based system and method for making a traffic regulation violation decision regarding vehicle activity during a stop light signal. The system automatically processes evidentiary images to discriminate between violating vehicles that run a red light and/or stop signal and non-violating vehicles that abruptly stop. However, the present disclosure is amenable to other like applications.

Red Light Camera Systems (RLCS) are traffic regulation enforcement systems that detect and identify vehicles that enter an intersection against a red traffic light and, therefore, are in violation of a traffic regulation. These systems can detect the violating vehicles by identifying license plate numbers and/or the make and model of the vehicles from photographs captured by red light cameras. A citation is then issued to the owner of the vehicle identified in a photograph.

In more specific detail, FIG. 1 shows how an existing RLCS system operates in the PRIOR ART. An enforcement camera 10 is installed in a protective metal box attached to a pole 12 at an intersection. To measure vehicle speed, two closely spaced induction loops ("sensors 14A, 14B") are embedded in the pavement near the stop line 16. When a vehicle activates both sensors within a predetermined time threshold, the sensors trigger the cameras 10, 18 to capture the event as a series of photographs or a video clip, which shows the vehicle 20 as it enters and proceeds through the intersection on a red light signal 22.

Existing systems generate a number of false detections, which can result in the issuance of erroneous tickets. These false detections mainly result from vehicles that abruptly stop at the stop line after triggering the sensors 14A, 14B within the predetermined time threshold. These systems furthermore require a law enforcement official review the photographs to determine if a violation occurred. This time consuming task also results in a significant number of the violations being rejected as false detections.

An improved system and method is desired which automatically detects non-violating vehicles, which are falsely identified as violating vehicles in the existing system. A system and method are desired which discriminates between violating and non-violating vehicles using evidentiary images.

INCORPORATION BY REFERENCE

David G. Lowe, et al., *Distinctive Image Features from Scale-Invariant Keypoints*, International Journal of Computer Vision 60.2 (2004) at pg. 91-110 is fully incorporated herein.

Herbert Bay, et al., *Speeded-up Robust Features (SURF)*, Computer Vision and Image Understanding 100.3 (2008) at pg. 346-359 is fully incorporated herein.

Chris Harris and Mike Stephens, *A Combined Corner and Edge Detector*, Alvey Vision Conference, Vol. 15, 1998 is fully incorporated herein.

Edward Rosten and Tom Drummond, *Machine Learning For High-Speed Corner Detection*, Computer Vision-ECCV (2006) at pg. 430-443 is fully incorporated herein.

Carlo Tomasi and Takeo Kanade, *Detection and Tracking of Point Features*, Technical Report. CMU-CS-91-132m School of Computer Science, Carnegie Mellon Univ. (1991) is fully incorporated herein.

P-E Forssen and David G. Low, *Shape Descriptors for Maximally Stable Extremal Regions*, International Conference on Computer Vision IEEE (2007) at pg. 1-8 is fully incorporated herein.

Navneet Dalal and Bill Triggs, *Histograms of Oriented Gradients for Human Detection*, Computer Vision and Pattern Recognition (2005) is fully incorporated herein.

Yan Ke and Rahul Sukthankar, *PCA-SIFT: A More Distinctive Representation For Local Image Descriptors*, Computer Vision and Pattern Recognition (2004) is incorporated fully herein.

BRIEF DESCRIPTION

One embodiment of the disclosure relates to a method for detecting a vehicle running a stop signal. The method includes acquiring at least two evidentiary images of a candidate violating vehicle captured from at least one camera monitoring an intersection. The method includes extracting feature points in each of the at least two evidentiary images. The method includes computing feature descriptors for each of the extracted feature points. The method includes determining a correspondence between feature points having matching feature descriptors at different locations in the at least two evidentiary images. The method includes extracting at least one attribute for each correspondence. The method includes determining if the candidate violating vehicle is in violation of running the stop signal using the extracted attribute.

Another embodiment of the disclosure relates to a system for detecting a vehicle running a stop signal. The system comprises a traffic regulation enforcement device including a memory and a processor in communication with the processor. The processor is configured to acquire at least two evidentiary images of a candidate violating vehicle captured from at least one camera monitoring an intersection. The processor is configured to extract feature points in each of the at least two evidentiary images. The processor is configured to compute feature descriptors for each of the extracted feature points. The processor is configured to determine a correspondence between feature points having matching feature descriptors at different locations in the at least two evidentiary images. The processor is configured to extract at least one attribute for each correspondence. The processor is configure to determine if the candidate violating vehicle is in violation of running the stop signal using the extracted attribute.

DETAILED DESCRIPTION

The present disclosure relates to a vision-based system and method for discriminating between violating vehicles that run a stop signal and non-violating vehicles that abruptly stop. Mainly, any vehicle that triggers the sensors of the RLCS to signal the camera to capture evidentiary images of it is treated by the system as a candidate violator. The present system automatically processes evidentiary images to make a violation decision regarding the candidate violating vehicle.

Figure 1:
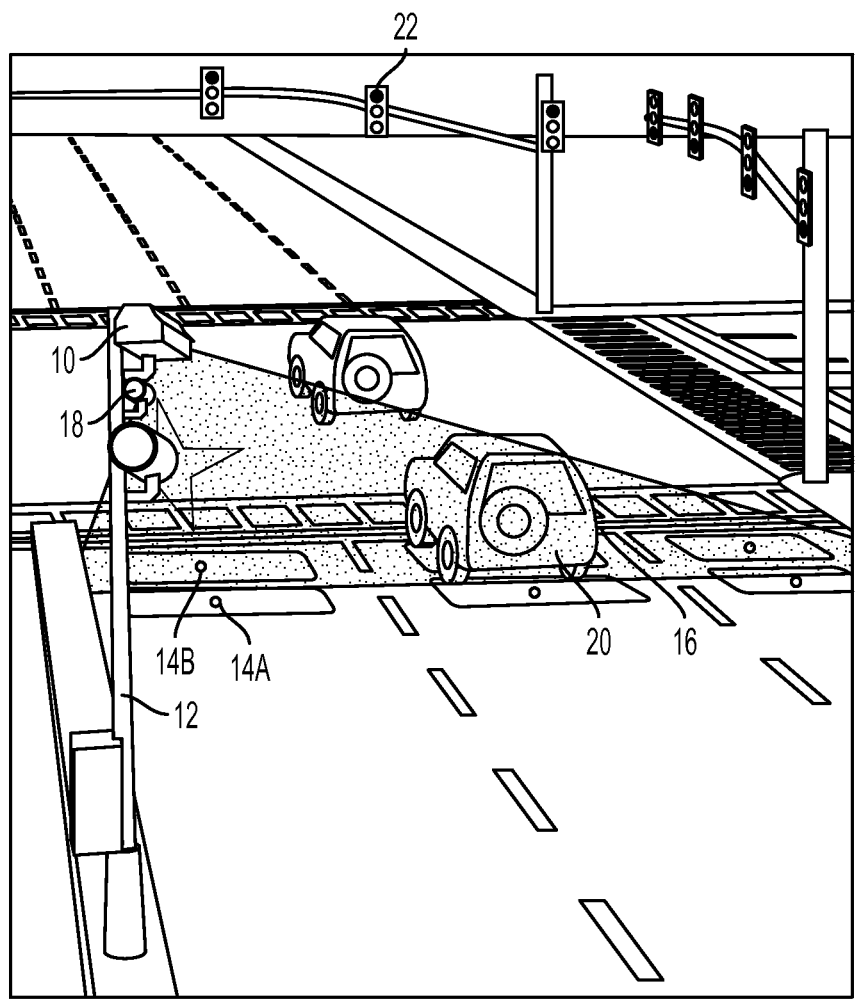
FIG. 1 shows how an existing RCLS system operates in the PRIOR ART.
Figure 2:
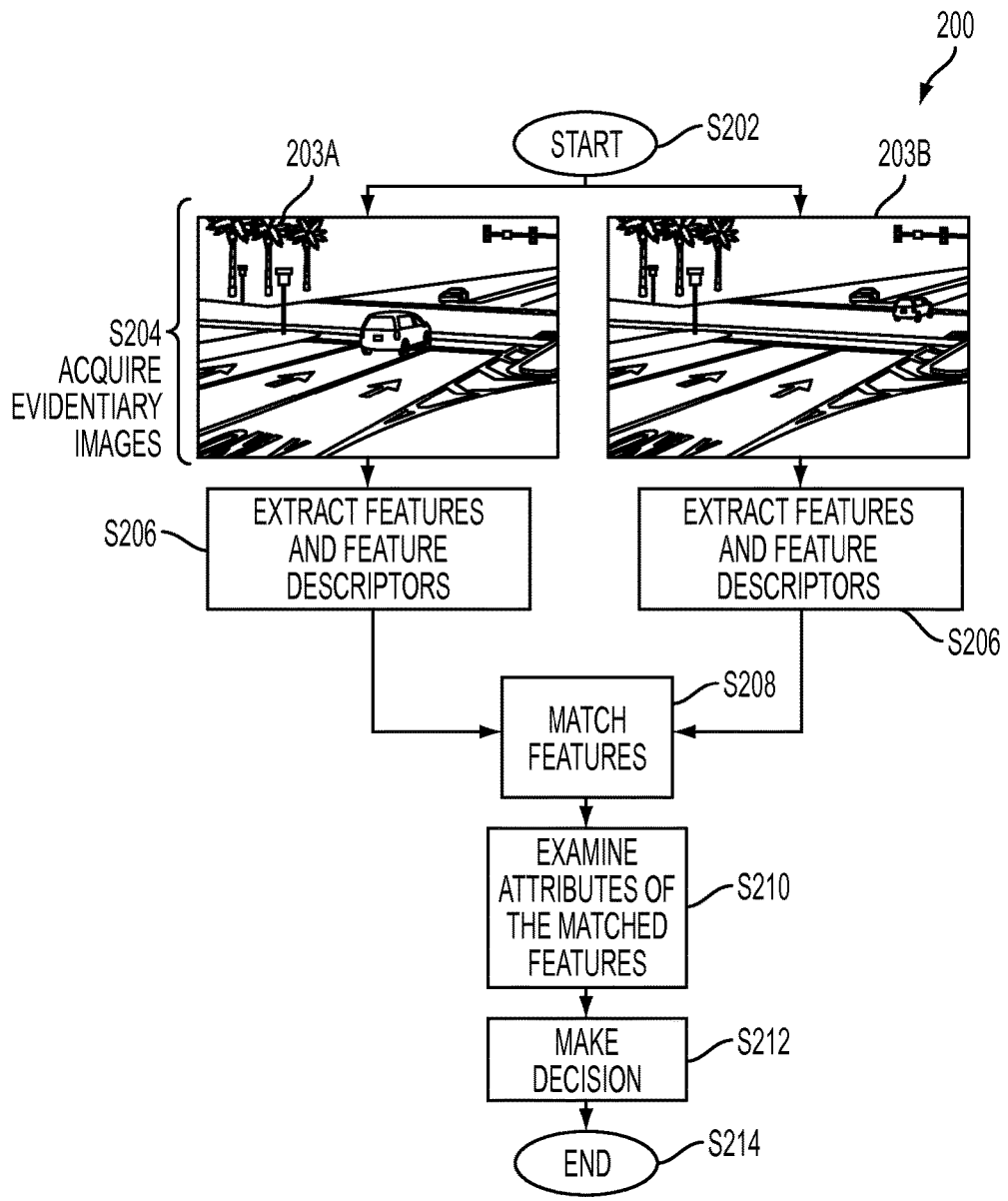
FIG. 2 is an overview of the present method.

An overview of the present method 200 is shown in FIG. 2. The method starts at S202. The system acquires evidentiary images at S204 capturing a first region of interest before an intersection and a second region of interest after the intersection. In FIG. 2, a first illustrative image 203A shows a candidate violating vehicle as it enters the intersection and a second illustrative image 203B shows the vehicle as it proceeds through the intersection, where the traffic is being guided using a stop signal. For illustrative purposes, the term "stop signal" herein mainly refers to a traffic light, such as a conventional red light having multiple signal lamps each displaying a different color for notifying drivers when to stop, use caution, and go. There is furthermore, no limitation made to the term "intersection", as the embodiments disclosed herein are amenable to any application making a violation decision when a vehicle proceeds to travel through a regulated region of interest, such as a yield-controlled, stop-controlled, or signal-controlled intersection, all of which are generally regulated to reduce a risk of vehicular accidents, etc. Generally, the two evidentiary images are taken in relation to when a vehicle triggers a sensor embedded in the road, and they assume to capture the vehicle just before an intersection and at the intersection. Therefore, the sensor can include an induction loop that, in response to being triggered, delays the camera a predetermined time to enable the capture of the violating vehicle proximate the intersection. The evidentiary images may be taken as additional evidence in support of a violation discrimination based on induction loops signals. Alternatively, the evidentiary images make be taken for the express purpose of red light violation discrimination, or for other purposes. The evidentiary images may be taken with a camera designed for still image capture, or the images could be isolated image frames from a temporal video sequence.

The system extracts a set of feature points and feature descriptors from each evidentiary image at S206. The system searches between the two evidentiary images for pairs of matching feature descriptors at S208. For each pair of matching descriptors, the system extracts an attribute(s) describing a correspondence between the pair at S210. In one example, the attribute is a computed length of a line connecting the feature points corresponding to the matching pair of descriptors on the image plane. In another example, the attribute is a computed angle between the line and a second line coinciding with the road direction.

In another example, the system can define a first region of interest (ROI) in the first image located before the stop area and a second ROI in the second image located after the stop area. The system can determine if a matching point in each pair falls within the first and second ROIs. If a cluster of matched feature pairs fall within the first and second ROIs, then the cluster can correspond to a vehicle traveling along the road direction. In this embodiment, the attribute is the number of matched feature pairs in the cluster.

The system makes a violation decision based on one or a combination of the attributes of the matched pair of feature descriptors at S212. Generally, the attribute can be compared to a predetermined threshold, and the violation decision can be based on an outcome of the threshold. The method ends at S214.

Figure 3:
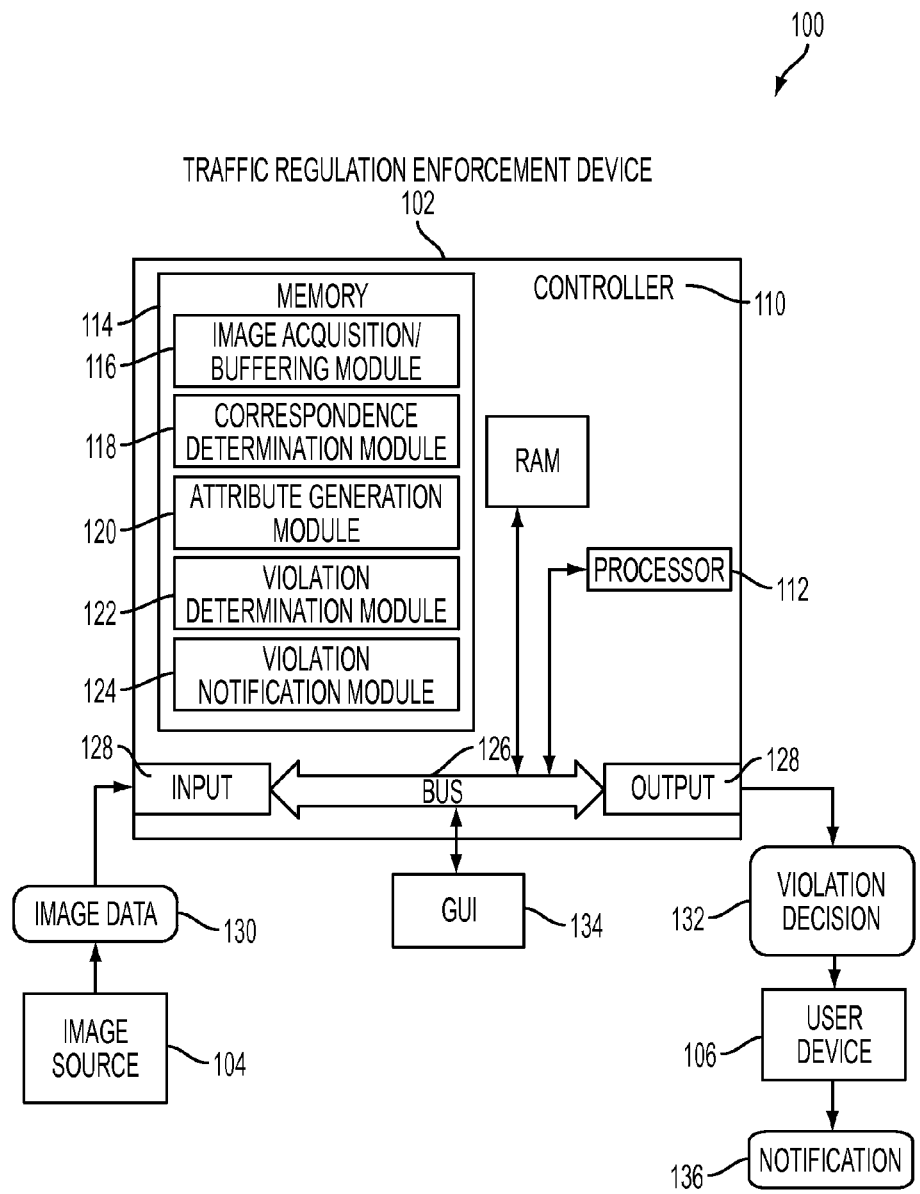
FIG. 3 is a schematic illustration of a vision-based system for making a traffic regulation violation decision regarding a vehicle running a stop light.

FIG. 3 is a schematic illustration of a vision-based system 100 for making a traffic regulation violation decision regarding a vehicle running a stop light. The system 100 includes a traffic regulation enforcement device 102, an image capture device 104—which may be incorporated in a conventional RLCS—linked together by communication links, referred to herein as a network. In one embodiment, the system 100 may be in further communication with a user device 106. These components are described in greater detail below.

The traffic regulation enforcement device 102 illustrated in FIG. 3 includes a controller 110 that is part of or associated with the device 102. The exemplary controller 110 is adapted for controlling an analysis of image data received by the system 100. The controller 110 includes a processor 112, which controls the overall operation of the device 102 by execution of processing instructions that are stored in memory 114 connected to the processor 112.

The memory 114 may represent any type of tangible computer readable medium such as random access memory (RAM), read only memory (ROM), magnetic disk or tape, optical disk, flash memory, or holographic memory. In one embodiment, the memory 114 comprises a combination of random access memory and read only memory. The digital processor 112 can be variously embodied, such as by a single-core processor, a dual-core processor (or more generally by a multiple-core processor), a digital processor and cooperating math coprocessor, a digital controller, or the like. The digital processor, in addition to controlling the operation of the device 102, executes instructions stored in memory 114 for performing the parts of the method outlined in FIGS. 2 and 4. In some embodiments, the processor 112 and memory 114 may be combined in a single chip.

The device 102 may be embodied in a networked device, such as the image capture device 104, although it is also contemplated that the device 102 may be located elsewhere on a network to which the system 100 is connected, such as on a central server, a networked computer, or the like, or distributed throughout the network or otherwise accessible thereto. In other words, the processing can be performed within the image capture device 104 on site or in a central processing offline or server computer after transferring the evidentiary images through a network. In one embodiment, the image source 104 can be a device adapted to relay and/or transmit the images to the device 102. In another embodiment, the image data 130 may be input from any suitable source, such as a workstation, a database, a memory storage device, such as a disk, or the like. The image source 104 is in communication with the controller 110 containing the processor 112 and memories 114.

The stages disclosed herein are performed by the processor 112 according to the instructions contained in the memory 114. In particular, the memory 114 stores an image buffering module 116, which receives evidentiary photographs ("images") capturing a first area before an intersection and a second area after an intersection; a correspondence determination module 118, which extracts feature points in each image, computes feature descriptors for each extracted feature point, and determines a correspondence between pairs of feature points having matching feature descriptors in the at least two evidentiary images; an attribute generation module 120, which extracts attribute(s) for describing each correspondence; a violation determination module 122, which determines if the candidate violating vehicle is in violation of running the intersection in lieu of a stop light using the extracted attribute(s); and, a violation notification module 124, which notifies a user of the violation decision. Embodiments are contemplated wherein these instructions can be stored in a single module or as multiple modules embodied in different devices. The modules 116-124 will be later described with reference to the exemplary method.

The software modules as used herein, are intended to encompass any collection or set of instructions executable by the device 102 or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, internet-based programs stored on a remote server or so forth, source code, interpretive code, object code, directly executable code, and so forth. It is contemplated that the software may invoke system-level code or calls to other software residing on a server (not shown) or other location to perform certain functions. The various components of the device 102 may be all connected by a bus 126.

With continued reference to FIG. 3, the device 102 also includes one or more communication interfaces 128, such as network interfaces, for communicating with external devices. The communication interfaces 128 may include, for example, a modem, a router, a cable, and and/or Ethernet port, etc. The communication interfaces 128 are adapted to receive the images ("image data 130") as input.

The device 102 may include one or more special purpose or general purpose computing devices, such as a server computer, controller, or any other computing device capable of executing instructions for performing the exemplary method.

FIG. 3 further illustrates the device 102 connected to an image capture device 104 for acquiring and/or providing the image data in electronic format. The image capture device 104 (hereinafter "camera 104") may include one or more surveillance cameras that capture photographs from the scene of interest. The number of cameras may vary depending on a length and location of the area being monitored. It is contemplated that the combined field of view of multiple cameras typically comprehends the entire area surrounding the intersection at least in the road direction. For performing the method at night in areas without external sources of illumination, the camera 104 can include near infrared (NIR) capabilities. In the contemplated embodiment, the camera 104 is a high resolution camera to enable the identification of violating vehicles through processes such as automatic license plate recognition (ALPR), etc.

With continued reference to FIG. 3, the image data 130 undergoes processing by the traffic regulation enforcement device 102 to output a violation decision 132.

Furthermore, the system 100 can display the violation decision and/or output in a suitable form on a graphic user interface (GUI) 134. The GUI 134 can include a display for displaying the information, to users, and a user input device, such as a keyboard or touch or writable screen, for receiving instructions as input, and/or a cursor control device, such as a mouse, touchpad, trackball, or the like, for communicating user input information and command selections to the processor 112. Alternatively, the device 102 can provide the violation decision to the output device 106, which can display the decision to a user, such as a traffic enforcement officer, or a notification 136 to the authority in charge of issuing citations. Furthermore, in one contemplated embodiment, violation decision can be transmitted to another computer application, which can perform additional processing on the image to identify owners of any violating vehicle for the purpose of issuing citations.

Figure 4A:
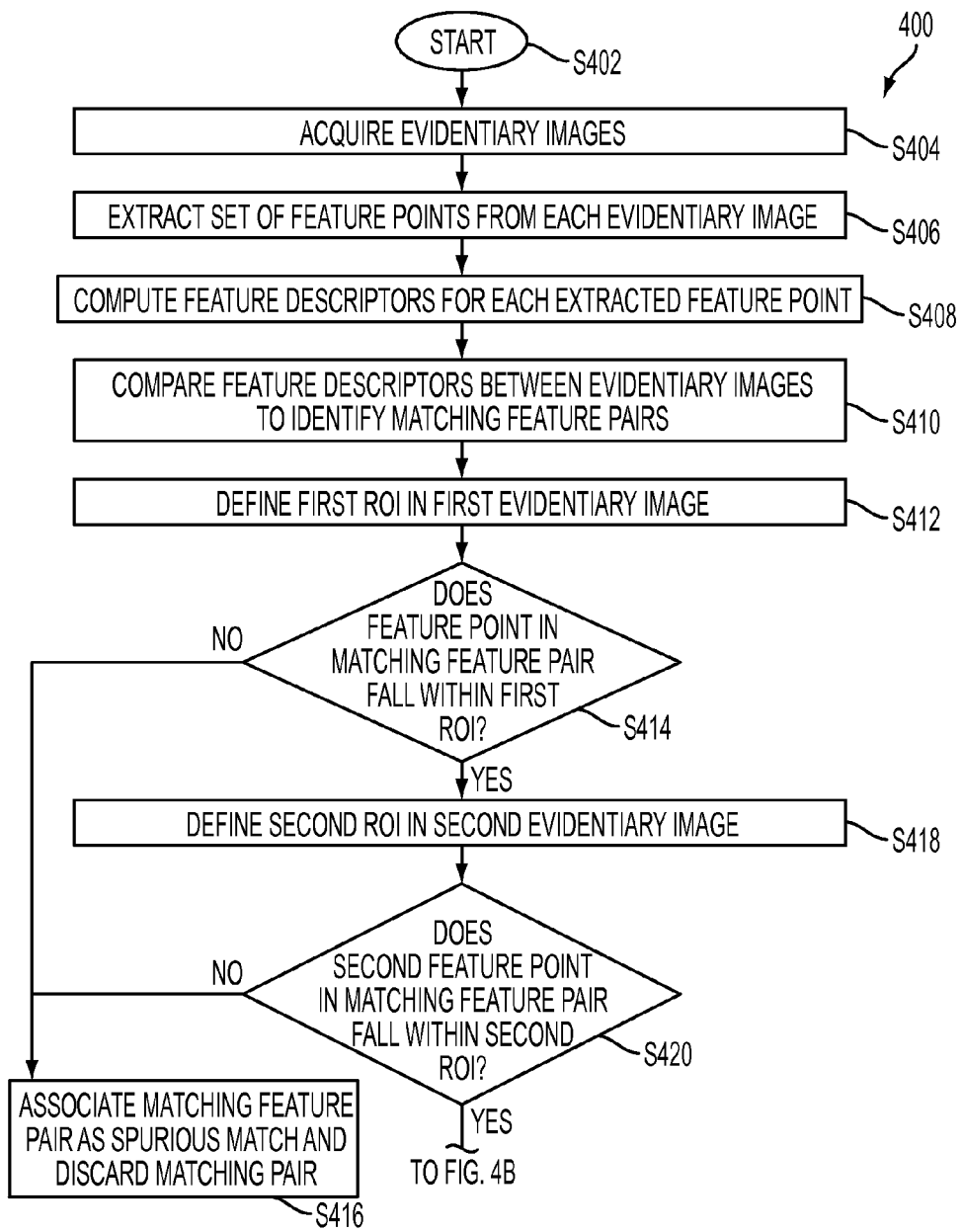
FIG. 4A-B is a flowchart describing a method for making a traffic regulation violation decision regarding vehicle activity during a stop light.
Figure 4B:
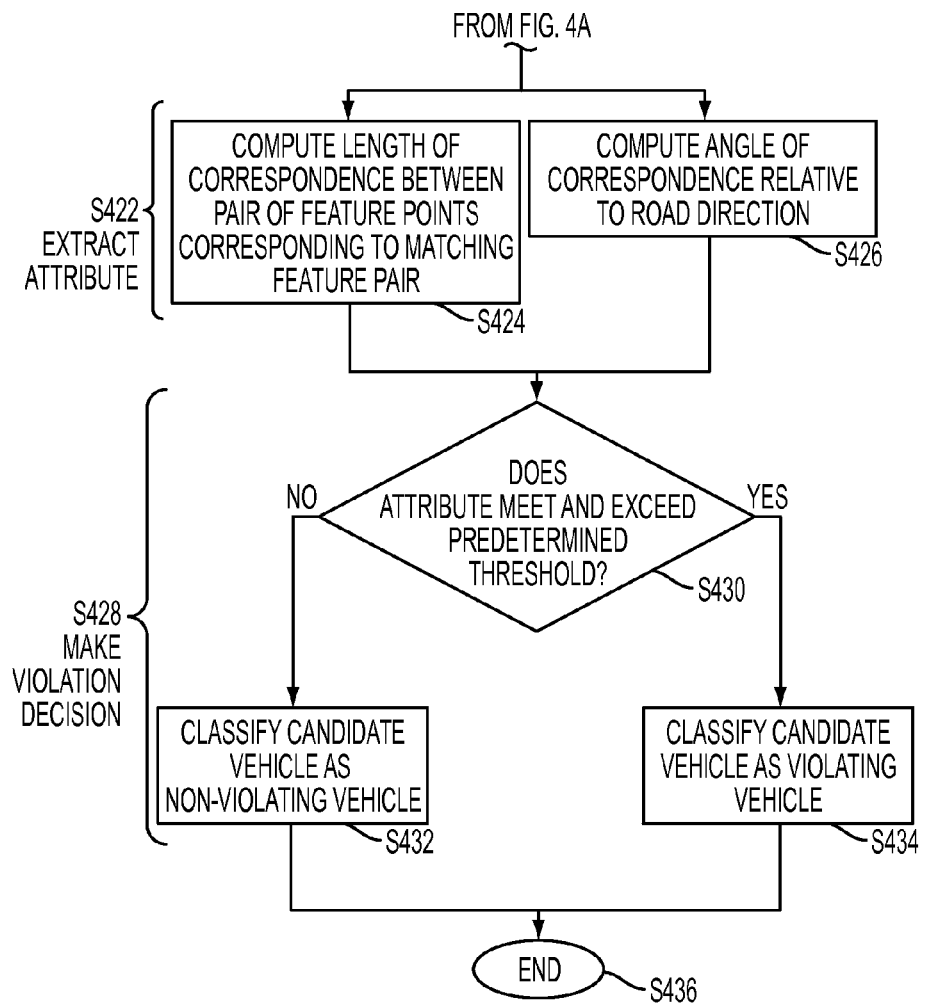

FIG. 4A-B is a flowchart describing a method 400 for making a traffic regulation violation decision regarding vehicle activity during a stop light signal. The method starts at S402.

Figure 5A:
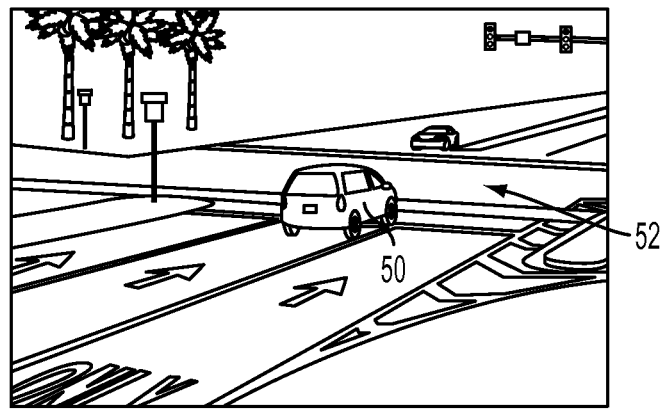
FIG. 5A is a first illustrative image showing a candidate violating vehicle as it enters a signal-controlled intersection.
Figure 5B:
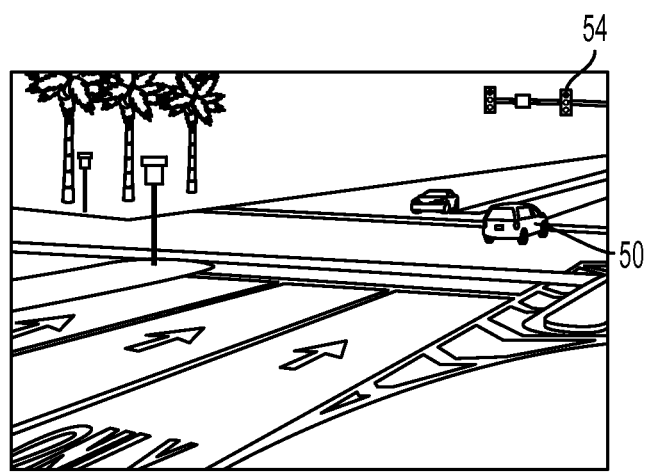
FIG. 5B is a second illustrative image showing the candidate violating vehicle of FIG. 5A running a red light.

At S404, the image buffering module 116 acquires evidentiary images captured from the RLCS. As mentioned supra, the RLCS operates to capture images of a vehicle during a stop light. The RLCS employs an in-ground induction loop having sensors that trigger a camera to capture images of vehicle activity in the scene of interest. However, embodiments are contemplated whereby the module 116 acquires the evidentiary images from a camera 104, which is in communication with a traffic light controller such that it captures images of the scene (e.g., intersection) of interest during the periods that traffic light is red. In yet another embodiment, the module 116 can acquire images from a camera that is operating to capture the images in response to user input and/or instruction. Generally, the module 116 acquires two evidentiary images for processing: a first image of the intersection before a stop line (or crossroad) and a second image of an area located within/after the intersection. Embodiments are contemplated, however, which process more than two images where the scene of interest is on the image plane. Generally, these images are assumed to capture the activity of a candidate violating vehicle. FIG. 5A is a first illustrative image showing a candidate violating vehicle 50 as it enters a signal-controlled intersection 52. FIG. 5B is a second illustrative image showing the candidate violating vehicle 50 of FIG. 5A running a red light 54.

At S406, the correspondence determination module 118 extracts a set of feature points from each evidentiary image. In one embodiment, the module can extract scale invariant feature points for employing in further processing. One approach for extracting scale invariant feature transform (SIFT) feature points is provided by David G. Lowe, et al., in the publication titled *Distinctive Image Features from Scale-Invariant Keypoints*, in International Journal of Computer Vision 60.2 (2004) at pg. 91-110 and is fully incorporated herein. One approach for extracting speeded-up robust feature points (SURF) is provided by Herbert Bay, et al., in the publication titled *Speeded-up Robust Features (SURF)*, in Computer Vision and Image Understanding 100.3 (2008) at 346-359 and is fully incorporated herein. One approach for extracting Harris corner features is provided by Chris Harris and Mike Stephens in the publication titled *A Combined Corner and Edge Detector*" in Alvey Vision Conference, Vol. 15, 1998 and is fully incorporated herein. One approach is contemplated for performing a fast accelerated segment test (FAST), which is described by Edward Rosten and Tom Drummond in the publication titled *Machine Learning For High-Speed Corner Detection* in Computer Vision-ECCV 2006 and is fully incorporated herein. One approach for extracting minimum eigenvalue algorithm feature points is provided by Carlo Tomasi and Takeo Kanade in the publication titled *Detection and Tracking of Point Features*, in School of Computer Science, Carnegie Mellon Univ. 1991 and is fully incorporated herein. Another approach for extracting maximally stable extremal region (MSER) feature points is provided by P-E Forssen and David G. Low in the publication titled *Shape Descriptors for Maximally Stable Extremal Regions* in Computer Vision 2007 and is fully incorporated herein.

Figure 6A:
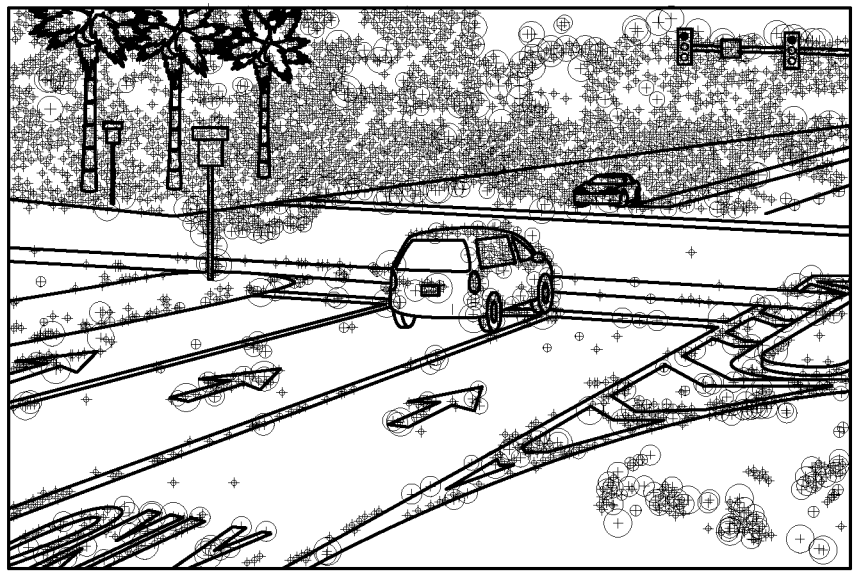
FIG. 6A is a first illustrative image showing feature descriptors extracted from the image in FIG. 5A.
Figure 6B:
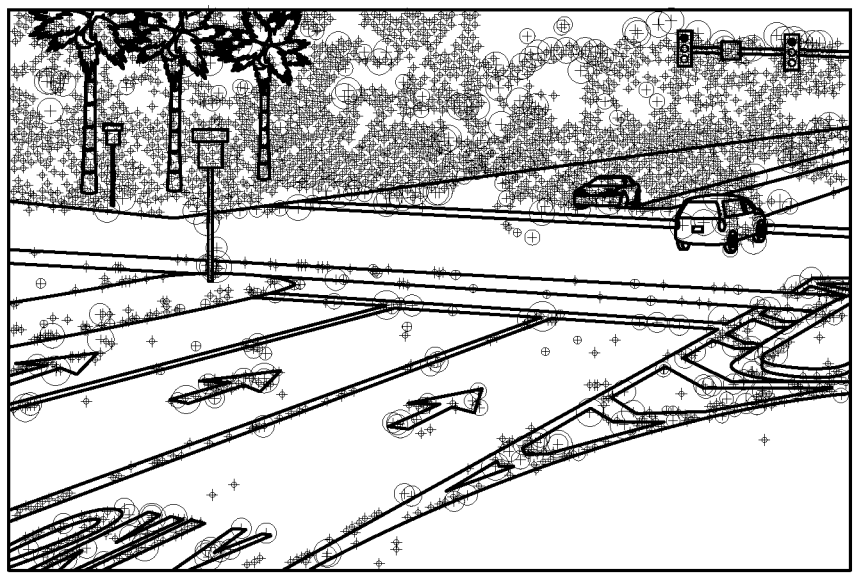
FIG. 6B is a second illustrative image showing feature descriptors extracted from the image in FIG. 5B.

FIG. 6A is a first illustrative image showing (SURF) feature points extracted from the image in FIG. 5A. Similarly, FIG. 6B is a second illustrative image showing (SURF) feature points extracted from the image in FIG. 5B.

The module 118 computes feature descriptors for each of the extracted feature points at S408. Mainly, the feature descriptors are typically computed in the local neighborhood of each feature point. There is no limitation made herein for which process is used for computing the feature descriptors. Rather, any known approach can be applied. One approach for computing feature descriptors using a histogram of gradients (HOG) is described by Navneet Dalal and Bill Triggs in the publication titled *Histograms of Oriented Gradients for Human Detection* in Computer Vision and Pattern Recognition 2005, which is incorporated herein fully. Another approach for computing feature descriptors using differences of Gaussian (DoG) filters is provided in the publication *Distinctive Image Features from Scale-Invariant Points*. Another approach for computing feature descriptors using Haar-wavelet responses is provided in the publication *Speeded-Up Robust Features (SURF)*.

Furthermore, the feature descriptors can be calculated in the local neighborhood of each feature point at different scales, particularly because certain features—such as SURF features—are scale invariant. The dimensionality of feature descriptors varies depending on the process used for extracting the features. For example, the dimensionality of the SURF descriptors is lower than the dimensionality of SIFT descriptors. Because the processing time/speed in the next stage of the operation depends on the dimension and complexity of the feature descriptor, which can be traded-off to keep a balance with the distinctiveness of the descriptor, a process can be performed on each feature descriptor to reduce its dimension. One approach to reduce dimension using principal component analysis (PCA-SIFT) is proposed by Yan Ke and Rahul Sukthankar in the publication titled *PCA-SIFT: A More Distinctive Representation For Local Image Descriptors*, in Computer Vision and Pattern Recognition 2004, which is incorporated fully herein.

Figure 7:
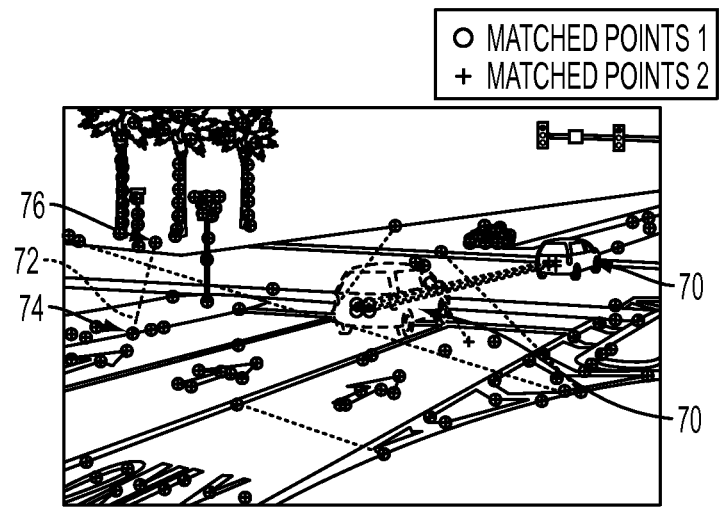
FIG. 7 is an illustrative image showing correspondences between matched pairs of feature descriptors extracted from the local neighborhood of each feature point in the images in FIGS. 6A and 6B.

Returning to FIG. 4, the computed feature descriptors in the first evidentiary image are compared against the computed feature descriptors in the second evidentiary image to find matching pairs of feature descriptors. In other words, a correspondence is determined between feature points having matching feature descriptors at different locations in the at least two evidentiary images at S410. Because locations of matched features can be the same in both of the evidentiary images, which is particularly expected for stationary objects, no action of interest is observed in these regions. However, a correspondence between a pair of feature points in different locations in the two images, but having matching feature descriptors, can be determined based on a distance between the descriptor points on the image plane. There is no limitation made herein to the distance metric used to determine the distance. Example approaches include a sum of squared distances (SSD), a sum of absolute distances, Mahalanobis and Euclidian distance, etc. The calculated distance can be compared with a predetermined threshold to identify the matched features between different images. FIG. 7 is an illustrative image showing correspondences between matched pairs of feature descriptors extracted from the local neighborhood of each feature point in the images in FIGS. 6A and 68. FIG. 7 represents an overlap of the first and second images, where the position of candidate violating vehicle 70 in the first image is shown in phantom.

Similar feature descriptors can be extracted/calculated for a number of feature points between the two evidentiary images that are associated with different objects. FIG. 7 illustrates this scenario with a number of spurious correspondences (such as, for example, path 72) between the matched points (for example, 74 and 76).

Figure 8A:
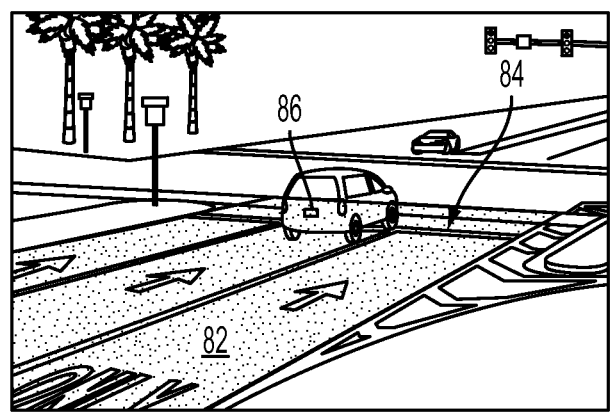
FIG. 8A is an illustrative first evidentiary image showing a sample first region of interest defined before a stop line.
Figure 8B:
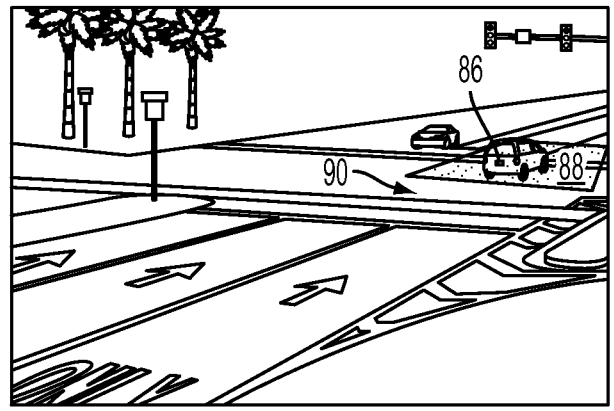
FIG. 8B is an illustrative second evidentiary image showing a sample second region of interest defined after an intersection.
Figure 8C:
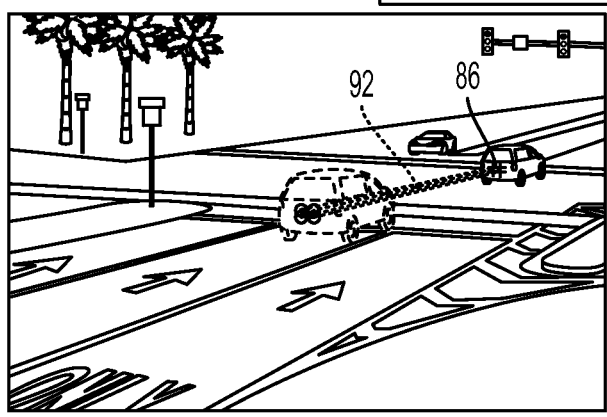
FIG. 8C is an illustrative image showing a remaining cluster of matching correspondences after discarding spurious matches/correspondences/pairs, which do not start within the first $ROI_B$ in FIG. 8A and end within the second $ROI_A$ in FIG. 8B

To remove the spurious matches, the attribute generation module 120 searches for a number of matched feature pairs—making up a coherent cluster—that each start and end in defined regions of interests. To compute the number of matched feature pairs, the attribute generation module 120 first defines a first region of interest (ROI) located on the image plane before the intersection in a first one of the evidentiary images at S412. For example, the first ROI can be defined before an existing or virtual stop bar. When the RLCS camera(s) takes the first evidentiary image, it aims to capture the candidate violating vehicle before the intersection. FIG. 8A is an illustrative image showing a sample first ROI 82 defined before a stop line 84. A candidate violating vehicle 86 is captured in the evidentiary image. The module 120 determines if any of the feature points of the matched feature pairs fall within the first ROI in the first evidentiary image at S414. This determination is made by identifying a location of the feature point corresponding to a first one in each pair of matching feature descriptors. Then, the module 120 determines if that location falls inside or outside the first ROI. In response to the location falling outside the first ROI (NO at S414), the module 120 associates the correspondence as belonging to a spurious match and discards the correspondence at S416. FIG. 8C is an illustrative image showing the remaining matched (SURF) features after eliminating the spurious matches/correspondences/pairs, which do not start within the first ROI.

In response to the location falling inside the first ROI (YES at S414), the module 120 defines a second region of interest located on the image plane after the intersection in a second one of the evidentiary images at S418. For example, the second ROI can be defined at and/or after the intersection. When the RLCS camera(s) takes the second evidentiary image, it aims to capture violating vehicles running through the intersection. FIG. 8B is an illustrative second evidentiary image showing a sample second ROI 88 defined after the intersection 90. The candidate violating vehicle 86 is captured in the evidentiary image. The module 120 determines if any of the feature points of the matched feature pairs fall within the second ROI in the second evidentiary image. This determination is made by identifying a location of the feature point corresponding to a second one in each pair of matching feature descriptors. Then, the module 120 determines if that location falls inside or outside the second ROI at S420. In response to the location falling outside the second ROI (NO at S420), the module 120 associates the correspondence as belonging to a spurious match and discards the correspondence at S416. FIG. 8C also shows the remaining matched features after eliminating the spurious matches/correspondences/pairs, which do not end within the second $ROI_A$.

In response to the location falling inside the second ROI (YES at S420), the module 120 performs further thresholding operation(s) on the remaining correspondences to discriminate between spurious and true matches. However, the aforementioned processes at S412-S420 of determining whether the feature points fall outside first and second ROIs, for purposes of discarding spurious matches, can be omitted in contemplated embodiments. Particularly, the spurious matches may also, in certain embodiments, be identified using the thresholding operations on each correspondence verses just the remaining correspondences.

Continuing with FIG. 4B, the attribute generation module 120 extracts at least one attribute describing each correspondence at S422. In one embodiment, the attribute includes a distance between (i.e., a length of a line connecting) locations of the matching pair feature points on the image plane of the two evidentiary images. The module 120 computes the length L of the line at S424 using the equation:

$$L=\sqrt{(x_2-x_1)^2+(y_2-y_1)^2}, \quad (1)$$

where $(x_1,y_1)$ is a location of a feature point in a first image and $(x_2,y_2)$ is a location of a matching feature point in a second image.

In another embodiment, the attribute includes an angle θ formed between a first line extending between locations of the matching feature points in the at least two evidentiary images and the second line being coincident along a road direction that the candidate violating vehicle is expected to travel through the intersection. The module 120 computes the angle θ at S426 using the equation:

$$\theta = \text{atan}\left(\frac{y_2-y_1}{x_2-x_1}\right), \quad (2)$$

where $(x_1,y_1)$ is a location of a feature point in a first image and $(x_2,y_2)$ is a location of a matching feature point in a second image.

After the attribute generation module 120 computes at least one attribute describing each correspondence, the violation determination module 122 determines whether the candidate violating vehicle is violating a traffic enforcement regulation at S428 by running through the yield-controlled, stop-controlled, or signal-controlled intersection. The module 122 makes a violation/non-violation decision based on the computed attribute(s).

As part of this decision, the module 122 identifies if there is a violating vehicle in the scene. In the discussed embodiment, a violation can only occur if the matched features on the violating vehicle fall on the road direction both before and after the intersection, although other embodiments are contemplated to consider left hand and right hand turns in violation of the traffic regulation. In these alternative embodiments, the second ROI can be defined past the intersection in the cross lane. In the discussed embodiment, the violation decision can be based on a criterion of finding coherent cluster of matched features that comply with at least one predetermined threshold.

As part of this violation decision in one embodiment, the module 122 identified the matched feature pairs that start within the first $ROI_B$ and end within the second $ROI_B$ at S414, S420. Among these pairs, the module 122 searches for a coherent cluster of correspondences. FIG. 8C shows an example cluster 92 of correspondences traveling together in the road direction. This cluster 92 corresponds to a number of matched pairs of vehicle features for vehicle 86. In one embodiment, the module 122 can determine if a group of correspondences belongs to a cluster if the number of matched pairs meets a predetermined number threshold.

In response to a cluster of correspondences satisfying the condition for starting and ending within the defined first and second ROIs, the module 122 can determine if the attribute associated with at least one correspondence in the cluster meets a predetermined threshold.

In the illustrative embodiment where the attribute is the distance L between (i.e., a length of a line connecting) locations of the matching pair feature points on the image plane of the two evidentiary images, the distance can be compared to a predetermined length threshold at S430. In one embodiment, the threshold can be the distance between the stop line and the other side of the intersection. In another embodiment, the threshold can be the distance between the stop line and the middle of the intersection, where the system can presume that a vehicle captured in the middle of the intersection will proceed to travel through the intersection. Although, any length threshold can be used to identify violators.

In one embodiment, the threshold can be zero "0". Locations are the same for most feature points having matching feature descriptors in the evidentiary images, particularly because of the stationary objects in the scene. A violating vehicle, however, will be located at different places in the two evidentiary images (see FIGS. 5A and 58) because it is moving through the intersection when the two images are captured. The distance between the pair of feature points of moving objects is different than the distance between stationary objects, which is expected to be zero "0". Accordingly, the computed length is compared to a predetermined threshold of zero "0" to eliminate the correspondences between stationary objects.

In response to the computed length not meeting the predetermined threshold (NO at S430), the module 122 can classify the candidate violating vehicle as belonging to a non-violating vehicle at S432. In response to the computed length meeting and exceeding the predetermined threshold (YES at S430), the module 122 can classify the candidate violating vehicle as being a violating vehicle at S434.

However, another embodiment is contemplated where in response to the computed length meeting and exceeding the predetermined threshold, the module 122 can perform at least a second thresholding operation on the select correspondence using a different attribute. This embodiment anticipates at least an additional attribute can be computed for the correspondence and compared to a second threshold.

In the illustrative embodiment where the attribute is the angle θ formed between the first line extending between locations of the matching feature points in the at least two evidentiary images and the second line being coincident along a road direction that the candidate violating vehicle is expected to travel through the intersection, the violating vehicle is expected to move along the road direction. Accordingly, the disclosure anticipates that a correspondence (or line) connecting a pair of feature points of the matched features also extends along the road direction. Therefore, the computed angle θ is compared to a predetermined threshold to eliminate the correspondences between spurious objects and/or moving objects (e.g., birds, pedestrians walking in the background, etc.) traveling in different directions that do not comply with the road direction at S430. In one embodiment, the threshold can defined as a predetermined interval around a calculated road angle—i.e., road direction on the image plane. In the discussed example, the road predetermined threshold can be (±5°), however a different angle threshold can be used to identify violators. For example, in the illustrative figures discussed herein, the road direction is in a straight line, but embodiments are contemplated where the intersection includes a number of road segments (e.g., 3-way intersection, 5-way intersection, etc.) where the crossing roads/streets are not perpendicular to each other or where the first side of the street in the road direction located before the intersection is not perpendicular to the second side of the street in the road direction located after the intersection.

In response to the computed angle θ meeting and exceeding the predetermined threshold (YES at S430), the violation determination module 122 can classify the candidate violating vehicle as belonging to a violating vehicle at S434. In response to the computed angle θ not meeting the predetermined threshold (NO at S430), the module 122 can classify the candidate violating vehicle as belonging to a non-violating vehicle at S432. The method ends at S436.

In an alternate embodiment, after the matched features are extracted between the evidentiary images, the system can apply the sets of features to a linear/non-linear classifier (e.g., SVM), which is trained beforehand using a classical supervised machine learning approach. In this approach, a vector of attributes is calculated for each of the matched feature pair. The classifier then makes a decision based on the vector of the attributes of the matched features.

One aspect of the present disclosure is a reduction in the number of false positives that generally result from the conventional RLCS enforcement system. Another aspect of the present disclosure is that the system and method employ the existing infrastructure of existing RLCS enforcement systems and can be easily integrated into those existing system.

Although the method 200, 400 is illustrated and described above in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated system 100, wherein the disclosure is not limited to the specific applications and embodiments illustrated and described herein.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method to detect a vehicle running a stop signal, the method comprising: acquiring at least two evidentiary images of a candidate violating vehicle captured from at least one camera monitoring an intersection, the at least two evidentiary images including a first image of an intersection before a stop line and a second image of an area located within or after the intersection; extracting feature points in each of the at least two evidentiary images; computing feature descriptors for each of the extracted feature points; determining a correspondence between feature points having matching feature descriptors at different locations in the at least two evidentiary images; extracting at least one attribute for each correspondence by determining if the each correspondence belongs to one of a spurious match and a true match; for each correspondence belonging to a true match, comparing the attribute to a threshold; and, classifying the candidate violating vehicle as belonging: to one of a violating vehicle running the stop signal and a non-violating vehicle based on the comparing.

2. The method of claim 1, wherein the classifying includes: in response to the angle meeting and exceeding the predetermined threshold, classifying the candidate violating vehicle as belonging to a non-violating vehicle, and in response to the angle not meeting the predetermined threshold, classifying the candidate violating vehicle as belonging to a violating vehicle.

3. The method of claim 1, wherein the attribute includes a length of a line connecting locations of the matching feature points in the at least two evidentiary images and the threshold includes a predetermined length.

4. The method of claim 3, wherein the length of the line is computed using the equation $L=\sqrt{(x_2-x_1)^2+(y_2-y_1)^2}$, where $(x_1, y_1)$ is a location of a feature point in a first image and $(x_2, y_2)$ is a location of a matching feature point in a second image.

5. The method of claim 3, further comprising:
in response to the length meeting and exceeding the predetermined threshold, classifying the candidate violating vehicle as belonging to a violating vehicle, and
in response to the length not meeting the predetermined threshold, classifying the candidate violating vehicle as belonging to a non-violating vehicle.

6. The method of claim 1, where the attribute includes an angle formed between a first line and a second line and the threshold includes a predetermined angle, the first line extending between locations of the matching feature points in the at least two evidentiary images and the second line being coincident along a road direction that the candidate violating vehicle is expected to travel through the intersection.

7. The method of claim 5, wherein the angle of the line is computed using the equation $$\theta = \operatorname{atan}\left(\frac{y_2 - y_1}{x_2 - x_1}\right);$$

wherein $(x_1, y_1)$ is a location of a feature point in a first image and $(x_2, y_2)$ is a location of a matching feature point in a second image.

8. The method of claim 1 further comprising:
defining a first region of interest (ROI) located before the intersection in a first of the at least two images;
determining a first location of a first one in a pair of matching points in the first image; and,
in response to the location falling outside the first ROI, associating the correspondence as a spurious match.

9. The method of claim 8 further comprising:
defining a second ROI located after the intersection in a second of the at least two images;
determining a second location of a second one in the pair of matching feature points in the second image; and
in response to the second location falling outside the second ROI, associating the correspondence as a spurious match.

10. The method of claim 9 wherein the extracting at least one attribute for each correspondence includes:
extracting the at least one attribute for each correspondence not belonging to a spurious match and discarding the each correspondence belonging to a spurious match.

11. A system for detecting a vehicle running a stop signal, the system comprising a traffic regulation enforcement device including a memory and a processor in communication with the processor configured to: acquire at least two evidentiary images of a candidate violating vehicle captured from at least one camera monitoring an intersection, the at least two evidentiary images including a first image of an intersection before a stop line and a second image of an area located within or after the intersection; extract feature points in each of the at least two evidentiary images; compute feature descriptors for each of the extracted feature points; determine a correspondence between feature points having matching feature descriptors at different locations in the at least two evidentiary images; extract at least one attribute for each correspondence by determining if the each correspondence belongs to one of a spurious match and a true match; for each correspondence belonging to a true match, comparing the attribute to a threshold; and, classifying the candidate violating vehicle as belonging to one of a violating vehicle running the stop signal and a non-violating vehicle based on the comparing.

12. The system of claim 11, wherein the attribute includes a length of a line connecting locations of the matching feature points in the at least two evidentiary images and the threshold includes a predetermined length.

13. The system of claim 12, wherein the length of the line is computed using the equation $L=\sqrt{(x_2-x_1)^2+(y_2-y_1)^2}$, where $(x_1, y_1)$ is a location of a feature point in a first image and $(x_2, y_2)$ is a location of a matching feature point in a second image.

14. The system of claim 12, wherein the processor is further configured to:
in response to the length meeting and exceeding the predetermined threshold, classify the candidate violating vehicle as belonging to a violating vehicle, and
in response to the length not meeting the predetermined threshold, classify the candidate violating vehicle as belonging to a non-violating vehicle.

15. The system of claim 11, where the attribute includes an angle formed between a first line and a second line and the threshold includes a predetermined angle, the first line extending between locations of the matching feature points in the at least two evidentiary images and the second line being coincident along a road direction that the candidate violating vehicle is expected to travel through the intersection.

16. The system of claim 15, wherein the angle of the line is computed using the equation $$\theta = \mathrm{atan}\left(\frac{y_2-y_1}{x_2-x_1}\right);$$

wherein $(x_1, y_1)$ is a location of a feature point in a first image and $(x_2, y_2)$ is a location of a matching feature point in a second image.

17. The system of claim 15, wherein the processor is further configured to:
in response to the angle meeting and exceeding the predetermined threshold, classify the candidate violating vehicle as belonging to a non-violating vehicle, and
in response to the angle not meeting the predetermined threshold, classify the candidate violating vehicle as belonging to a violating vehicle.

18. The system of claim 11, wherein the processor is further configured to:
define a first region of interest (ROI) located before the intersection in a first of the at least two images;
determine a first location of a first one in a pair of matching feature points in the first image; and,
in response to the location falling outside the first ROI, associate the correspondence as being a spurious match.

19. The system of claim 18, wherein the processor is further configured to:
define a second ROI located after the intersection in a second of the at least two images;
determine a second location of a second one in a pair of matching feature points in the second image; and
in response to the second location falling outside the second ROI, associate the correspondence as being a spurious match.

20. The system of claim 19, wherein the processor is configured to:
extract the at least one attribute for each correspondence not belonging to a spurious match and discard the each correspondence belonging to a spurious match.

* * * * *